(12) United States Patent
Takada et al.

(10) Patent No.: US 11,966,068 B2
(45) Date of Patent: Apr. 23, 2024

(54) INORGANIC WAVE PLATE AND MANUFACTURING METHOD THEREFOR

(71) Applicant: Dexerials Corporation, Tokyo (JP)

(72) Inventors: Akio Takada, Tokyo (JP); Kazuyuki Shibuya, Tokyo (JP); Shigeshi Sakakibara, Tokyo (JP); Toshiaki Sugawara, Tokyo (JP); Yusuke Matsuno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 755 days.

(21) Appl. No.: 17/054,404

(22) PCT Filed: May 7, 2019

(86) PCT No.: PCT/JP2019/018267
§ 371 (c)(1),
(2) Date: Nov. 10, 2020

(87) PCT Pub. No.: WO2019/216315
PCT Pub. Date: Nov. 14, 2019

(65) Prior Publication Data
US 2021/0072446 A1 Mar. 11, 2021

(30) Foreign Application Priority Data
May 10, 2018 (JP) .................. 2018-091325

(51) Int. Cl.
*G02B 5/30* (2006.01)
*C03C 15/00* (2006.01)

(52) U.S. Cl.
CPC ............ *G02B 5/3083* (2013.01); *C03C 15/00* (2013.01)

(58) Field of Classification Search
CPC ...... G02B 5/30; G02B 5/3083; G02B 5/3058; G02B 5/1857; G02B 27/0172;
(Continued)

(56) References Cited

U.S. PATENT DOCUMENTS

2005/0275944 A1* 12/2005 Wang ................. G02F 1/13363
359/578
2011/0085238 A1* 4/2011 Minemura ............. G02B 5/085
359/489.01
(Continued)

FOREIGN PATENT DOCUMENTS

CN 107922182 A 4/2018
JP H11-231132 A 8/1999
(Continued)

OTHER PUBLICATIONS

Decision of Refusal issued in Japanese Application No. 2018-091325 dated Jun. 7, 2022 (7 pages).
(Continued)

*Primary Examiner* — Stephone B Allen
*Assistant Examiner* — Jyotsna V Dabbi
(74) *Attorney, Agent, or Firm* — Osha Bergman Watanabe & Burton LLP

(57) ABSTRACT

Provided is a structural birefringence-type inorganic wave plate having excellent heat resistance and durability, and a fine pattern. Also provided is a manufacturing method for an inorganic wave plate by which, even in the case of a fine pattern, productivity is high, and a desired phase difference is easily achieved and stably obtained. This inorganic wave plate is obtained by utilizing a selective interaction between a polymer having a repeating unit containing a carbonyl group, and a metallic oxide precursor, the inorganic wave plate having a wire grid structure provided with a transparent substrate, and grid-shaped protruding portions arranged at a pitch shorter than the wavelength of light in a used band on at least one surface of the transparent substrate and extending in a predetermined direction, the main component of the grid-shaped protruding portion being a metallic oxide.

5 Claims, 3 Drawing Sheets

(58) Field of Classification Search
CPC . G02F 1/13363; G02F 1/13368; C03C 15/00; C03C 2217/76; C03C 2218/328; C03C 2218/33; C03C 17/38; B82Y 20/00; B82Y 40/00
USPC .................................................... 359/489.07
See application file for complete search history.

(56) References Cited

U.S. PATENT DOCUMENTS

| | | |
|---|---|---|
| 2012/0046421 A1 | 2/2012 | Darling et al. |
| 2017/0242335 A1 | 8/2017 | Chan et al. |
| 2018/0244518 A1 | 8/2018 | Miraglia et al. |
| 2019/0157622 A1 | 5/2019 | Nawata et al. |

FOREIGN PATENT DOCUMENTS

| | | |
|---|---|---|
| JP | 2010-211856 A | 9/2010 |
| JP | 2013-200908 A | 10/2013 |
| WO | 2016/200947 A1 | 12/2016 |
| WO | 2017/061170 A1 | 4/2017 |
| WO | 2018/012523 A1 | 1/2018 |

OTHER PUBLICATIONS

Office Action issued in Chinese Application No. 201980028707.4 dated May 25, 2022 (18 pages).
Decision of Refusal issued in Chinese Patent Application No. 201980028707.4 dated Sep. 9, 2022 (16 pages).
International Search Report issued in Application No. PCT/JP2019/018267, dated Jul. 30, 2019 (5 pages).
Written Opinion issued in International Application No. PCT/JP2019/018267, dated Jul. 30, 2019 (10 pages).
Office Action in counterpart Chinese Patent Application No. 201980028707.4 dated Nov. 3, 2021 (19 pages).
Office Action in counterpart Japanese Patent Application No. 2018-091325 dated Jan. 18, 2022 (8 pages).

* cited by examiner

INORGANIC WAVE PLATE AND MANUFACTURING METHOD THEREFOR

TECHNICAL FIELD

The present invention relates to an inorganic wave plate, and a manufacturing method therefor.

BACKGROUND ART

Wave plates are elements that provide with a specific phase difference, and are mounted on various optical devices. Typically, ½ wave plates, ¼ wave plates, and phase difference plates that provide a smaller phase difference than these wave plates have been known. Provided that the angle between the optical axis of the wave plate and linearly polarized light is θ when the linearly polarized light is incident, the ½ wave plate has a function of emitting linearly polarized light rotated by 2θ. The ¼ wave plate has a function of receiving, for example, linearly polarized light inclined by 45° in the plane from the optical axis of the wave plate, and converting the light into circular polarized light.

Conventionally, as the wave plate, what is called a phase difference film with an orientation being applied to a polymer film, has been known (see Patent Document 1). However, the wave plate made of a polymer film tends to be easily degraded heat and UV rays. Accordingly, there is a problem with durability. For example, for devices using a light source with a high optical intensity such as of a laser beam, heat resistance and light resistance are sometimes insufficient.

A structural birefringence-type wave plate using birefringence due to a grid structure made up of a line-and-space indented pattern, has been known as another type of wave plate (see Patent Document 2). The structural birefringence-type wave plate, which forms a grid structure, is more excellent in comparison with a polymer-film wave plate that applies a desired orientation by extending a film material, in that a uniform performance can be exhibited.

In recent years, the demand for achieving high density, high integration, and high performance in various electronic devices has been growing more and more. Also, for the structural birefringence-type wave plate, a finer pattern is required. However, the wave plate using structural birefringence has the structure with wavelength order, and furthermore, a high aspect ratio is required to achieve a typically required phase difference (λ/4, λ/2). Accordingly, the structural birefringence-type wave plate that satisfies the required level has been in a situation of being significantly cult to be manufactured.

Patent Document 1: Japanese Unexamined Patent Application, Publication No. H11-231132
Patent Document 2: Japanese Unexamined Patent Application, Publication No. 2013-200908

DISCLOSURE OF THE INVENTION

Problems to be Solved by the Invention

The present invention has been made in view of the above background art, and has an object to provide a structural birefringence-type inorganic wave plate that is excellent in heat resistance and durability, and has a fine pattern. Furthermore, the present invention has an object to provide a manufacturing method for an inorganic wave plate by which, even in the case of a fine pattern, productivity is high, and a desired phase difference is easily achieved and stably obtained.

Means for Solving the Problems

The present inventors have found that use of selective interaction between a polymer having a repeating unit containing a carbonyl group, and a metal oxide precursor can achieve a structural birefringence-type inorganic wave plate that has high productivity even with a fine pattern, is excellent in heat resistance and in durability, can achieve a desired phase difference, and stably obtain the desired phase difference, thus having completed the present invention.

That is, the present invention is an inorganic wave plate having a wire grid structure, including: a transparent substrate; and grid-shaped protruding portions that are arranged on the transparent substrate at a pitch shorter than a wavelength of light in a used band, and extend in a predetermined direction, the grid-shaped protruding portions containing a main component that is a metal oxide.

The grid-shaped protruding portions may have at least two or more types of different pitches present in a mixed manner.

The metal oxide may be $Al_2O_3$.
The metal oxide may be $TiO_2$.

Another aspect of the present invention is a method of manufacturing an inorganic wave plate having a wire grid structure, including: a polymer grid forming step of forming a polymer grid, by arranging a polymer having a repeating unit containing a carbonyl group, on at least one surface of a transparent substrate, so as to form a grid extending in a predetermined direction; a metal oxide precursor contact step of forming a metal oxide precursor binding site, by contacting vapor of the metal oxide precursor with the polymer grid to bind metal of the metal oxide precursor to the carbonyl group; and an oxidation step of forming a metal oxide grid containing a metal oxide as a main component, by contacting moisture vapor with the grid having the metal oxide precursor binding site to oxidize the metal oxide precursor binding site.

The metal oxide precursor contact step, and the oxidation step may form a cycle, and the cycle may be repeated multiple times.

A sequence of the polymer having the repeating unit containing the carbonyl group in the polymer grid forming step may be formed by self-assembly of the polymer having the repeating unit containing the carbonyl group.

The polymer grid forming step may use a physical guide.
The repeating unit containing the carbonyl group may be derived from methylmethacrylate.

The polymer having the repeating unit containing the carbonyl group may be a block copolymer containing molecular chains made of polymethlmethacrylic acid, and molecular chains made of polystyrene.

Furthermore, an etching step of performing etching using the metal oxide grid as a mask may be included.

Effects of the Invention

The inorganic wave plate according to the present invention is configured on an inorganic material. Accordingly, this wave plate is excellent in heat resistance and durability in comparison with a wave plate made of a polymer material. Consequently, the inorganic wave plate of the present invention is sufficiently applicable to devices that use light sources with a high optical intensity, such as laser beams. Selection of a highly refractive material (e.g., $TiO_2$) as the metal oxide configuring the grid-shaped protruding portions can achieve a thin-film inorganic wave plate, and obtain a zero-order wave plate. In the case where the sequence of the polymer having the repeating unit containing the carbonyl group is made to be fine, an inorganic wave plate that includes grid-shaped protruding portions with a finer pattern can be achieved. As a result, the demand for high performance devices can be satisfied.

The method of manufacturing an inorganic wave plate according to the present invention can manufacture a structural birefringence-type inorganic wave plate, with a high productivity, even with a fine pattern. Furthermore, if etching is executed with a mask that is the grid-shaped protruding portions containing a metal oxide as a main component, grid-shaped protruding portions having a high aspect ratio can be fabricated. Accordingly, an inorganic wave plate that can easily achieve a desired phase difference, and can stably obtain the desired phase difference can be obtained.

PREFERRED MODE FOR CARRYING OUT THE INVENTION

Embodiments of the present invention are hereinafter described in detail with reference to the drawings.
[Inorganic Wave Plate]
An inorganic wave plate of the present invention is a structural birefringence-type wave plate that uses birefringence due to a grid structure. Specifically, the inorganic wave plate has a wire grid structure, and includes: a transparent substrate; and grid-shaped protruding portions that are arranged on at least one surface of the transparent substrate at a pitch shorter than a wavelength of light in a used band, and extend in a predetermined direction, the grid-shaped protruding portions containing a main component that is a metal oxide. Note that the inorganic wave plate of the present invention is only required to include the transparent substrate and the grid-shaped protruding portions, and may further include another layer besides them.

Figure 1A:
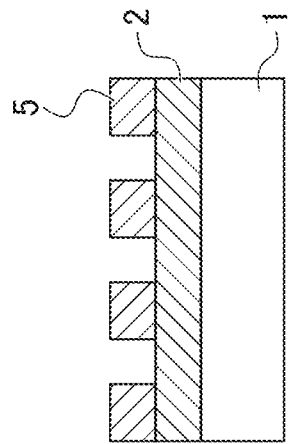
FIGS. 1A, 1B, 1C, 1D, 1E, and 1F show one embodiment of the present invention.
Figure 1B:
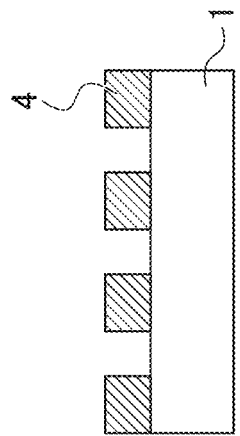
Figure 1C:
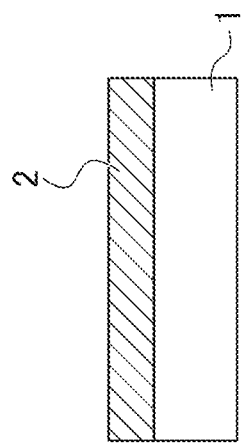
Figure 1D:
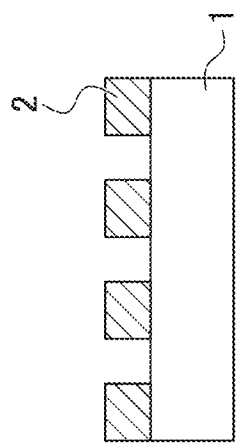
Figure 1E:
Figure 1F:
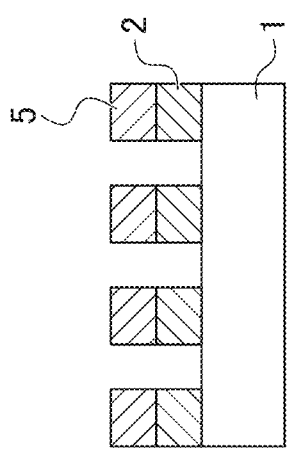
Figure 2A:
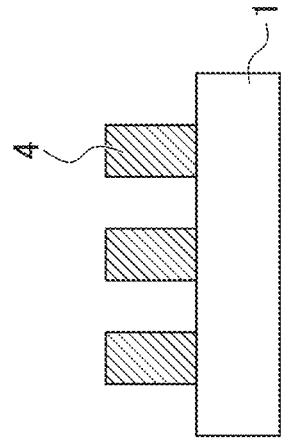
FIGS. 2A, 2B, 2C, and 2D show one embodiment of the present invention.
Figure 2B:
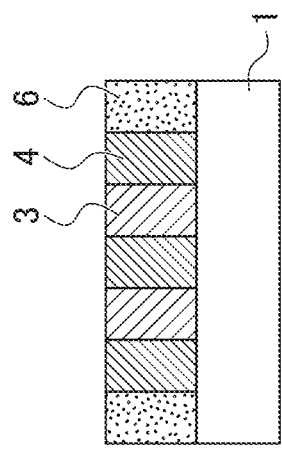
Figure 2C:
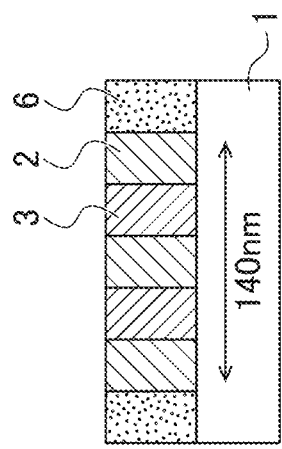
Figure 2D:
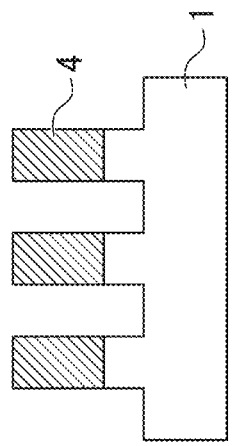

FIG. 1F and FIG. 2D are each schematic sectional views showing an inorganic wave plate according to one embodiment of the present invention. As shown in FIG. 1F and FIG. 2D, the inorganic wave plate includes: a transparent substrate 1; and grid-shaped protruding portions that are arranged on one surface of the transparent substrate 1 at a pitch shorter than the wavelength of light in a used band, and are configured of areas 4 containing a metal oxide as a main component. That is, the inorganic wave plate of the present invention has a wire grid structure where the grid-shaped protruding portions containing the metal oxide as a main component are arranged on at least one surface of the transparent substrate in a one-dimensional grid shape.

Here, the structural birefringence-type wave plate is a wave plate that uses birefringence due to a grid structure made up of a line-and-space indented pattern. For example, as described in "Submicrometer periodicity grids as artificial anisotropic dielectrics" (Dale C. Flanders, Appl. Phys. Lett. 42(6), 15 Mar. 1983), wave plates having refractive indices different between the directions parallel with and perpendicular to the structure due to the material and indented ratio of the fine structure, can be achieved. The speed of light in a substance is inversely proportional to the refractive index. According, the speed of light varies with respect to polarized waves in the respective directions. As a result, the phases of incident light vary before and after the structural birefringence wave plate. While birefringence properties of crystal, calcite, etc. are intrinsic to the substances, and can hardly be changed, an appearing optical performance of the structural birefringence-type wave plate can be controlled by changing the dimensions of the indented cyclic structure, and the constituent material.

(Transparent Substrate)

The transparent substrate (transparent substrate 1 in FIG. 1) is not specifically limited if it is a substrate exhibiting light transmittance to the light in the used band, and the substrate may be appropriately selected in conformity with the purpose.

"Exhibiting light transmittance to the light in the used band" does not mean that the transmittance of the light in the used band is 100%. Instead, it is only required to exhibit light transmittance allowing the functions as those of the wave plate to be maintained. The light in the used band may be, for example, visible light having a wavelength of about 380 nm to 810 nm.

The principal surface shape of the transparent substrate is not specifically limited, and a shape in conformity with the purpose (e.g., a rectangular shape) is appropriately selected. Preferably, the mean thickness of the transparent substrate ranges, for example, from 0.1 mm to 1 mm.

Preferably, the constituent material of the transparent substrate is material having a refractive index ranging from 1.1 to 2.2, and a material having no optically active property is suitable. In view of cost and light transmittance, it is preferable to adopt glass, specifically quartz glass (refractive index of 1.46), or soda-lime glass (refractive index of 1.51). The component composition of a glass material is not specifically limited, and for example, inexpensive glass material, such as silicate glass, which is widely commercially available as optical glass, may be adopted.

(Grid-Shaped Protruding Portions)

The grid-shaped protruding portions (for example, the areas 4 containing the metal oxide as a main component in FIG. 1F) are formed on one side surface of the transparent substrate at a pitch shorter than the wavelength of the light in the used band, and are arranged in a predetermined direction in a belt-like manner. That is, the inorganic wave plate of the present invention has an indented cyclic structure where the grid-shaped protruding portions, and recess portions serving as grooves are cyclically repeated. Note that in the invention, another layer may be present between the transparent substrate and the grid-shaped protruding portions.

It is only required that the grid-shaped protruding portions of the inorganic wave late of the present invention contain a metal oxide as a main component, and other components may be contained together with the metal oxide. The grid-shaped protruding portions may also include a layer other than the layer containing the metal oxide as a main component. For example, the inorganic wave plate of the present invention encompasses a mode of applying etching with a mask that is the grid-shaped protruding portions containing a metal oxide as a main component, to form engraved portions at the recess portions. In this case, the grid-shaped protruding portions are configured by a layer containing a metal oxide as a main component, and a layer formed by the engraved portions.

The pitch of the grid-shaped protruding portions in the inorganic wave plate of the present invention is not specifically limited if the pitch is shorter than ½ the wavelength of the light in the used band. However, it is more desirable that the pitch be shorter. In a case of use for visible light, as the wavelength of the blue region is 400 nm, the pitch is required to be smaller than 200 nm accordingly. The cycle length of the grid-shaped protruding portions of the inorganic wave plate of the present invention can be controlled by the molecular weight of the polymer having the repeating unit containing the carbonyl group used as a material. As a result, a small pitch equal to or less than 100 nm can be easily fabricated.

The pitch of the grid-shaped protruding portions can be measured by observation through a scanning electron microscope or a transmission electron microscope. For example, pitches may be measured at freely selected four positions using a scanning electron microscope or a transmission electron microscope, and an arithmetic mean value thereof can be adopted as the pitch of the grid-shaped protruding portions. This measurement method is hereinafter called an electron microscope method.

The grid-shaped protruding portions of the inorganic wave plate of the present invention may have two or more types of different pitches present in a mixed manner. In the present invention, for the sake of exhibiting the desired optical performance, it is preferable that the grid-shaped protruding portions and the recess portions serving as grooves have a cyclic structure with a cyclically repetitive arrangement. Accordingly, even in a case where two or more types of different pitches are present in a mixed manner, it is preferable to adopt a cyclical arrangement.

The constituent materials of the grid-shaped protruding portions are not specifically limited, the materials contain, as a main component, a metal oxide formed of a precursor that interacts selectively with a polymer having the repeating unit containing the carbonyl group. For example, the material may be $Al_2O_3$, $TiO_2$. Among them, $Al_2O_3$ is preferable in view of moisture resistance. In a case of using $Al_2O_3$, wave plate having excellent moisture vapor barrier properties can be achieved. In view of achieving a thin-film inorganic wave plate, $TiO_2$ having a high refractive index (the refractive index is about 2.0) is preferable. According to the present invention, selection of the highly refractive material can achieve the zero-order wave plate.

The inorganic wave plate of the present invention is the structural birefringence-type wave plate. Accordingly, the appearing optical performance can be controlled by changing the dimensions of the indented cyclic structure of the grid-shaped protruding portions, and the constituent material. For example, in a case of configuring grid-shaped protruding portions with materials containing $Al_2O_3$ as a main component, the refractive index of $Al_2O_3$ is about 1.6. Accordingly, to fabricate a ¼ wave plate with the ratio between projections and recess portions being (L/S)=1, the required film thickness is about 250 nm. As described above, to fabricate a ¼ wave plate for wavelength of 450 nm with the ratio between projections and recess portions being (L/S)=1 using $TiO_2$ having a high refractive index (refractive index about 2.0), the required film thickness is about 110 nm, and the wave plate to be obtained is allowed to have a thin film thickness.

The film thickness of the grid-shaped protruding portions is a film thickness required to exhibit a desired optical performance, and accordingly, is not specifically limited. For example, the thickness may range from 30 nm to 3000 nm. Note that the film thickness of the grid-shaped protruding portions can be measured by the electron microscope method described above, for example.

In the case where the inorganic wave plate of the present invention is the mode of applying etching with a mask that is the grid-shaped protruding portions containing a metal oxide as a main component to form engraved portions at the recess portions, the grid-shaped protruding portions are configured by the layer containing the metal oxide as the main component, and the layer where the engraved portions are formed. Furthermore, in the inorganic wave plate of the present invention, there may be another layer between the transparent substrate, and the grid-shaped protruding portions. Accordingly, the grid-shaped protruding portions include a layer containing a metal oxide as a main component, another layer, and/or a transparent substrate, in some cases. The other layer may be, example, a layer made of silica ($SiO_2$), or tantalum oxide ($Ta_2O_5$), which are high-refractive index materials.

(Protective Film)

At least the surface of the inorganic wave plate of the present invention on which light is incident may be covered with a protective film, within a range that does not affect the optical characteristics. Preferably, the protective film is configured of a dielectric material. For example, it is preferable to adopt $SiO_2$. Inclusion of the protective film improves the mechanical performance, and an effect of protecting the indented shape can be expected.

(Water-Repellent Film)

At least the surface of the inorganic wave plate of the present invention on which light is incident may be covered with a water-repellent film. Preferably, the water-repellent film is an organic one. For example, it is preferable to adopt fluorosilane compound, such as perfluorodecyltriethoxysilane (FDTS). Accordingly, dust is prevented from entering the inorganic wave plate, and the reliability, such as of moisture resistance, can be improved.

[Method of Manufacturing Inorganic Wave Plate]

A method of manufacturing an inorganic wave plate according to the present invention includes at least a polymer grid forming step, a metal oxide precursor contact step, and an oxidation step.

(Polymer Grid Forming Step)

The polymer grid forming step forms a polymer grid, by arranging a polymer having a repeating unit containing a carbonyl group, on at least one surface of a transparent substrate, so as to form a grid extending in a predetermined direction.

{Polymer Having the Repeating Unit Containing the Carbonyl Group}

According to the present invention, in the metal oxide precursor contact step described later, the metal oxide precursor is bound to the carbonyl group contained in the polymer having the repeating unit containing the carbonyl group. Accordingly, in the present invention, the carbonyl group is a necessary configuration element, but the polymer having the repeating unit containing the carbonyl group to be used is not specifically limited if the polymer contains a carbonyl group in a polymer repeating unit.

Preferably, the polymer having the repeating unit containing the carbonyl group used in the method of manufacturing an inorganic wave plate according to the present invention has a self-assembly capability. If the polymer has a self-assembly capability, a sequence serving as a grid extending in the predetermined direction can be easily formed by self-assembly. The polymer that has such a self-assembly capability, and includes the repeating unit containing the carbonyl group may be, for example, a block copolymer containing molecular chains made of polymethylmethacrylate, and molecular chains made of polystyrene, a block copolymer containing molecular chains made of polyethylmethacrylate, and molecular chains made of polystyrene, a block copolymer containing molecular chains made of t-butyl polymethacrylate, and molecular chains made of polystyrene, a block copolymer containing molecular chains made of polymethylacrylate, and molecular chains made or polystyrene, a block copolymer containing molecular chains made of polyethylacrylate, and molecular chains made or polystyrene, a block copolymer containing molecular chains made of t-butyl polyacrylate, and molecular chains made or polystyrene, etc. In view or excellence in self-assembly capability, a block copolymer having a unit derived from methylmethacrylate is preferable among them.

In particular, preferably, the polymer that has the repeating unit containing the carbonyl group and is used in the method of manufacturing an inorganic wave plate according to the present invention is a block copolymer containing molecular chains made of polymethylmethacrylic acid, and molecular chains made of polystyrene. The molecular chains made of polymethylmethacrylic acid have an excellent self-assembly capability. The block containing the molecular chains made of polymethylmethacrylic acid, and the block containing the molecular chains made of polystyrene further progresses the self-assembling, is phase-separated to a structure having an orderly domain, such as a lamella, and forms a cyclic pattern. The shape and dimensions of the domain can be adjusted design of the block copolymer, and a cyclic nanoscale lamella structure can also be formed.

{Arrangement by Photolithography Method}

In the polymer grid forming step, the method of arranging the polymer having the repeating unit containing the carbonyl group to form a grid extending in the predetermined direction, on at least one surface of the transparent substrate, is not specifically limited, but for example, can be implemented using a photolithography method.

FIG. 1 shows the method of arranging the polymer having the repeating unit containing the carbonyl group to form a grid extending in the predetermined direction, using the photolithography method.

To achieve the arrangement forming the grid extending in the predetermined direction using photolithography method, first, as shown in FIG. 1B, a layer made of the polymer having the repeating unit containing the carbonyl group (in FIG. 1B, an area 2 including molecular chains made of polymethylemethacrylic acid (PMMA)) is formed on at least one surface of the transparent substrate 1.

Next, photoresist is arranged on the formed layer made of the polymer having the repeating unit containing the carbonyl group (in FIG. 1B, the area 2 including the molecular chains made of polymethylmethacrylic acid (PMMA)), exposure and transfer of a photomask are performed by photolithography, and subsequently a development process is executed to form a pattern of resist 5 with line-and-space (L/S) as shown in FIG. 1C.

Subsequently, the obtained L/S pattern (the pattern of the resist 5 in FIG. 15) is used as a mask and etching is executed to remove the layer made of the polymer having the repeating unit containing the carbonyl group (in FIG. 1B, the area 2 including the molecular chains made of polymethylmethacrylic acid (PMMA)) (FIG. 1D).

Lastly, the resist 5 is dissolved with a chemical or the like and removed, thereby obtaining a polymer grid where the polymer having the repeating unit containing the carbonyl group is arranged to form a grid extending in the predetermined direction as shown in FIG. 1E.

{Arrangement Due to Self-Assembly}

In the polymer grid forming step, another method of arranging the polymer having the repeating unit containing the carbonyl group to form a grid extending in the predetermined direction, on at least one surface of the transparent substrate, may be a method of self-assembly using a polymer having a self-assembly capability, for example.

The polymer that has a self-assembly capability, and includes the repeating unit containing the carbonyl group may be the polymer having the unit derived from methylmethacrylate as a repeating unit, for example, as described above. Specifically, a block copolymer that contains molecular chains made of polymethylmethacrylic acid, and molecular chains made of polystyrene is preferable. The block copolymer that contains the molecular chains made of polymethylmethacrylic acid, and the molecular chains made of polystyrene phase-separated to a structure having an orderly domain, such as a lamella, to form a cyclic pattern. The design of the block copolymer can adjust the shape and dimensions of the domain, and the pattern according to the cyclic nanoscale lamella structure can also be achieved.

Note that in the case of using the block copolymer having a self-assembly capability, and performing phase-separation to a structure having an orderly domain, such as a lamella, to form a cyclic pattern, the metal oxide precursor contact step, and the oxidation step described later are subsequently executed to convert the polymer having the repeating unit containing the carbonyl group into a metal oxide. Lastly, a step of removing the area configured by molecular chains containing no carbonyl group, with a chemical or the like, is executed.

(Self-Assembly Using Physical Guide)

Furthermore, walls called physical guides are used, a polymer that has a self-assembly capability, and includes the repeating unit containing the carbonyl group, is stored between the walls, thereby allowing a pattern to be more easily formed. In the case of using the physical guides, the physical guide width, and the width of the pattern formed by phase-separation due to self assembly are not necessarily identical to each other. Differentiation can eventually achieve an inorganic wave plate including grid-shaped protruding portions where two or more types of different pitches are present in a mixed manner.

FIG. 2 shows the method of arranging the polymer having the repeating unit containing the carbonyl group to form a grid extending in the predetermined direction, using the physical guides. In a mode shown in FIG. 2, a block copolymer that contains molecular chains made of polymethylmethacrylic acid, and molecular chains made of polystyrene is used.

In the method of using the physical guides, first, a guide pattern having a predetermined pitch interval is formed by a photolithography method or the like (guides 6 in FIG. 2A.). Next, a polymer that has a self-assembly capability, and includes a repeating unit containing a carbonyl group is stored in the recess portions of the formed physical guide pattern, and is phase-separated to a structure having an orderly domain by self-assembly, a pattern is formed. Because the physical guides are present, the self-assembling polymer more easily forms a cyclic lamella structure along the physical guides. As a result, a polymer grid where the polymer having the repeating unit containing the carbonyl group is arranged to be a grid extending in the predetermined direction, can be created.

In the mode shown in FIG. 2, the block copolymer that contains the molecular chains made of polymethylmethacrylic acid, and the molecular chains made of polystyrene is stored in the recess portions of the pattern of the guides 6 having the predetermined pitch interval. The stored block copolymer is phase-separated to the structure having an orderly domain along the physical guides 6 owing to self-assembly, to form a cyclic lamella structure where the areas 2 including the molecular chains made of polymethylmethacrylic acid (PMMA), and areas 3 including the molecular chains made of polystyrene are alternately present. As a result, the polymer grid is created where the polymer having the repeating unit containing the carbonyl group (in FIG. 2A, the areas 2 including the molecular chains made of polymethylmethacrylic acid (PMMA)) is arranged to form a grid extending in the predetermined direction.

As described above, in the case of using the block copolymer having a self-assembly capability, the metal oxide precursor contact step, and the oxidation step described later are executed, and after converting the area of the molecular chains having the repeating unit containing the carbonyl group (in FIG. 2A, the area 2 including the molecular chains made of polymethylmethacrylic acid (PMMA)) to a metal oxide, lastly, the step of removing, with a chemical etc., the area configured by the molecular chains containing no carbonyl group (in FIG. 2B, the areas 3 including the molecular chains made of polystyrene), and the physical guides (in FIG. 2B, the guides 6) is executed.

A method of fabricating physical guides is not specifically limited, and may be, for example, a method of dissolving a material that is to serve as guides in a solvent, subsequently applying and drying it to form a coating film, applying resist on the formed coating film to form a resist layer, exposing the resist layer to light and develop it to form a resist pattern, etching the coating film that serves as guides using the obtained resist pattern, and subsequently separates the resist to obtain final physical guides.

The material of the physical guides is not specifically limited, and a polymer can be used, for example. Specifically, it is preferable to use polymer having characteristics resistant to deformation even after the step of fabricating the above described physical guides.

The solvent for dissolving the material that is to serve as guides can be appropriately selected in consideration of compatibility with the polymer that is to serve as guides, drying characteristics, etc. A preferable combination between the material that is to serve as guides, and the solvent may be, for example, a combination between a random copolymer of polymethylmethacrylic acid (PMMA)/polystyrene (PS), and toluene or propylene glycol monoethyl ether acetate.

(Metal Oxide Precursor Contact Step)

The metal oxide precursor contact step forms a metal oxide precursor binding site by contacting vapor of the metal oxide precursor with the polymer grid formed by the polymer grid forming step to bind metal of the metal oxide precursor to the carbonyl group in the polymer.

In FIG. 1, the metal oxide precursor contact step in the present invention is executed in a transition process from FIG. 1E to FIG. 1F, and in FIG. 2, is executed in a transition process from FIG. 2A to FIG. 2B. That is, this step is a step to be executed to cause the areas 2 of the molecular chains made of the repeating units containing the carbonyl group in FIG. 1E to be the areas 4 containing the metal oxide as the main component in FIG. 1F, and is a step to be executed to cause the areas 2 of the molecular chains made of the repeating units containing the carbonyl group in FIG. 2A to be the areas 4 containing the metal oxide as the main component in. FIG. 2B.

{Metal Oxide Precursor}

The metal oxide precursor contact step contacts the substance serving as a precursor of a metal oxide, in a form of vapor, with the carbonyl group in the polymer that forms the polymer grid. The metal oxide precursor to be supplied as vapor has characteristics of being bound selectively to the carbonyl group. The metal oxide precursor binds to the molecular chains having the repeating unit containing the carbonyl group, and grows on the molecular chain, but is substantially unreactive to molecular chains having no carbonyl group.

Consequently, the metal oxide precursor that binds selectively to the carbonyl group and is usable for the present invention is a compound exhibiting characteristics as Lewis acid, and for example, is trimethyl aluminum (TMA), titanium tetrachloride ($TiCl_4$), etc. In the case of using trimethyl aluminum (TMA), aluminum oxide ($Al_2O_3$) is eventually obtained as a metal oxide. In the case of using titanium tetrachloride (TiCl4), titanium oxide ($TiO_2$) is eventually obtained as a metal oxide.

Contact between the metal oxide precursor to be supplied, and the substrate performed, for example, as follows. The substrate is arranged in a chamber that can hold vacuum. Subsequently, the inside of the chamber is vacuum-exhausted by a dry pump or the like. To advance the reaction, the substrate temperature is caused to range from 150° C. to 250° C. Next, the metal oxide precursor is introduced into the chamber. Preferably, pressure of vapor this case ranges from 0.1 to 1 mTorr. Preferably, the contact time period ranges from 300 seconds to 600 seconds. In this range, the reaction sufficiently advances. After the predetermined contact time period elapses, the chamber is exhausted again.

(Oxidation Step)

The oxidation step forms a metal oxide grid containing a metal oxide as a main component, by contacting moisture vapor with the grid having the metal oxide precursor binding site formed in the metal oxide precursor contact step, to oxidize the metal oxide precursor binding site. The obtained metal oxide grid contains the metal oxide as the main component, and accordingly, the grid-shaped protruding portions having a high etching resistance and an improved heat resistance are achieved.

In FIG. 1, the oxidation step in the present invention is executed in a transition process from FIG. 1E to FIG. 1F, and in FIG. 2, is executed in a transition process from FIG. 2A to FIG. 2B. That is, this step is a step to be executed to cause the areas 2 of the molecular chains made of the repeating units containing the carbonyl group in FIG. 1E to be the areas 4 containing the metal oxide as the main component in FIG. 1F, and is a step to be executed to cause the areas 2 of the molecular chains made of the repeating units containing the carbonyl group in FIG. 2A to be the areas 4 containing the metal oxide as the main component in FIG. 2B.

The oxidation step is executed after the metal oxide precursor contact step is executed. This is because the target of oxidation in the oxidation step is the grid having the metal oxide precursor binding site formed in the metal oxide precursor contact step. In the grid having the metal oxide precursor binding site, the metal at the metal oxide precursor binding site is oxidized using moisture vapor to be converted into the metal oxide.

Preferably, the pressure of moisture vapor to be supplied in the oxidation step is a pressure of one atmosphere or a pressure close thereto. Preferably, the substrate temperature ranges from 150° C. to 250° C. Preferably, the contact time period ranges from 300 seconds to 600 seconds. In this range, oxidation is sufficiently achieved without specific problems.

(Repetition)

Preferably, the method of manufacturing an inorganic wave plate according to the present invention forms the metal oxide precursor contact step, and the above described oxidation step as one cycle, and repetitively executes multiple cycles of these steps.

That is, preferably, in FIG. 1, the metal oxide precursor contact step, and the oxidation step are repetitively executed in the transition process from FIG. 1E to FIG. 1F, and in the transition process from FIG. 2A to FIG. 2B in FIG. 2, thus eventually transitioning to FIG. 1F or FIG. 2B.

Multiple repetitions of the cycle of the metal oxide precursor contact step and the oxidation step can further improve the ratio or conversion from the molecular chains made up of the repeating unit containing the carbonyl group into the metal oxide, and a substantially complete metal oxide can be eventually achieved. It is preferable that the number or repetitions in the present invention be seven or more, and it is most preferable that the number be 10 or more.

(Grid-Shaped Protruding Portions Forming Step)

In the method of manufacturing an inorganic wave plate according to the present invention, in the case of using the block copolymer configured by the molecular chains having the repeating unit containing the carbonyl group, and the molecular chains having no carbonyl group, as the polymer having the repeating unit containing the carbonyl group, the grid-shaped protruding portions forming step is executed.

The grid-shaped protruding portions forming step is a step required in the case of using the block copolymer configured by the molecular chains having the repeating unit containing the carbonyl group, and the molecular chains having no carbonyl group, and is a step executed after the above described metal oxide precursor contact step, and the oxidation step are executed multiple cycles if required, and the polymer having the repeating unit containing the carbonyl group is converted into the metal oxide. Specifically, the polymer having the repeating unit containing the carbonyl group is converted into the metal oxide, and subsequently the area configured by the molecular chains having no carbonyl group, and the physical guides if used, are removed using a chemical or the like, thereby forming the grid-shaped protruding portions containing the metal oxide as the main component.

For example, in the mode in FIG. 2 that is the mode us the physical guides, the step is executed between FIG. 2B and FIG. 2C, the areas 3 that include the molecular chains having no carbonyl group, configuring the areas 3 having the molecular chains made of polystyrene, and the guides 6 are removed using a chemical or the like, thus forming the grid-shaped protruding portions configured by the areas 4 containing the metal oxide as the main component.

(Etching Step)

The method of manufacturing an inorganic wave plate according to the present invention may further include an etching step of performing etching using the metal oxide grid formed by the oxidation step as a mask. The etching step is a step executed between FIG. 2C to FIG. 2D in FIG. 2. FIG. 2D shows a mode where engraved portions are formed in the transparent substrate 1 by etching, and a part of the transparent substrate 1 configures a part of the grid-shaped protruding portions.

However, in the present invention, another layer may be present between the layer containing the metal oxide as the main component constituting the grid-shaped protruding portions, and the transparent substrate. Accordingly, in the etching step, the engraved portions are formed only in the other layer, or in both the other layer and the transparent substrate, in some cases. In the case of forming the engraved portions only in the other layer, the grid-shaped protruding portions are configured by the layer containing the metal oxide as the main component, and the other layer. In the case of forming the engraved portions in both the other layer and the transparent substrate, the grid-shaped protruding portions are configured by the layer containing the metal oxide as the main component, the other layer, and a part of the transparent substrate.

As the inorganic wave plate of the present invention is the structural birefringence-type wave plate, the appearing optical performance can be controlled by changing the dimensions of the cyclic structure of the grid-shaped protruding portions. To obtain a typically required phase difference ($\lambda/4$, $\lambda/2$), a high aspect ratio is required. The present invention executes etching using the metal oxide grid as the mask, and forms the engraved portions at the recess portions, thereby allowing the grid-shaped protruding portions to have a high aspect ratio. Furthermore, desired dimensions can be achieved by adjustment through etching, thereby allowing the desired optical characteristics to be exhibited.

The etching method is not specifically limited, and may include, for example, a dry etching method using etching gas that supports an etching target. For example, in a case of adopting quartz as the transparent substrate, use of $CF_4$ as etching gas can achieve etching.

(Protective Film Application Step)

The method of manufacturing an inorganic wave plate according to the present invention may include a protective film application step of covering, with a protective film, at least the surface on the side which light is incident. The protective film application step forms the protective film on at least the surface (on which the wire grid is formed) of the wave plate, using CVD (Chemical Vapor Deposition) or ALD (Atomic Layer Deposition), for example. Preferably, the protective film is a film made of a dielectric material. For example, it is preferable to adopt $SiO_2$.

(Water-Repellent Film Application Step)

The method of manufacturing an inorganic wave plate according to the present invention may include a water-repellent film application step of covering, with a water-repellent film, at least the surface on the side which light is incident. The water-repellent film application step can form a water-repellent film on at least the surface of the wave plate (the surface on which the wire grid is formed) using the above described CVD or ALD, for example. Preferably, the water-repellent film is a film made of an organic material. For example, it is preferable to adopt fluorosilane compound, such as perfluorodecyltriethoxysilane (FDTS).

[Use Application]

The inorganic wave plate of the present invention can be mounted on various optical devices. The optical device may be a liquid crystal projector, a head-up display, a digital camera or the like. As the plate is an inorganic wave plate excellent in heat resistance and durability in comparison with an organic wave plate made of an organic material, the wave plate is particularly suitable for use applications, such as a liquid crystal projector, or a head-up display, which requires heat resistance and durability.

EXAMPLES

Next, Examples of the present invention are described with reference to FIGS. 2 and 3. However, the present invention not limited to the Examples.

Example 1

In Example 1, a method of storing the polymer that has a self-assembly capability between the walls of the physical guides, and includes the repeating unit containing the carbonyl group, using the physical guides, and forming the pattern, was executed.

[Creation of Guide Pattern]

Figure 3A:
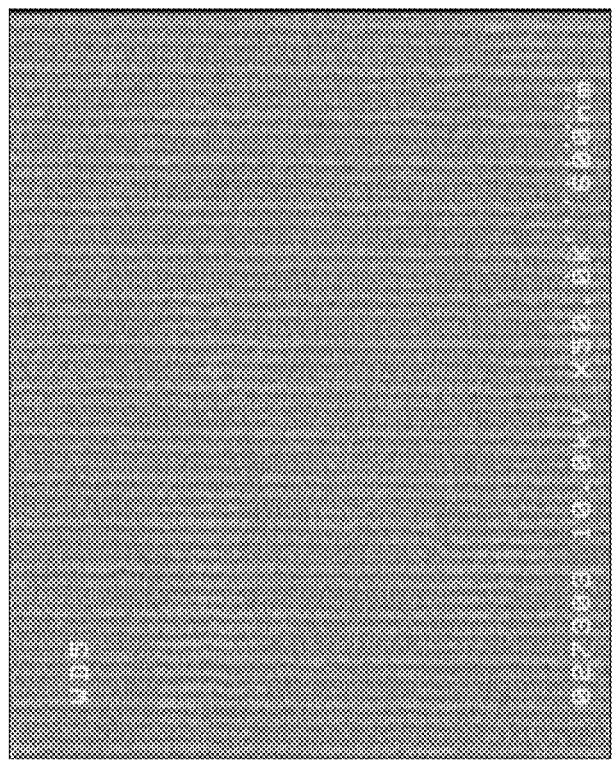
FIGS. 3A and 3B show photographs in an embodiment having a guide pattern.

A random copolymer of molecular chains made of polymethylmethacrylic acid, and molecular chains made of polystyrene (molecular weight: about 40000) was dissolved in toluene to have a concentration of 1.5 percent mass. Subsequently, the obtained solution was spin-coated to fabricate a neutral layer. Furthermore, photoresist was coated on the fabricated neutral layer, thus forming a photoresist layer. Subsequently, the photoresist layer was exposed to light, and was developed, thereby forming a resist pattern. The obtained resist pattern was used to etch the neutral layer with $O_2$ plasma, and subsequently, the resist was separated, thereby forming a guide pattern (the guides 6 in FIG. 2A) made up of the neutral layer. The film thickness of the guide (height) was 13 nm. FIG. 3(a) shows a photograph of the obtained guide pattern.

[Storing Block Copolymer]

Between the walls of the guides (guides 6 in FIG. 2A) of the obtained guide pattern, the block copolymer that contains the molecular chains made of polymethylmethacrylic acid, and the molecular chains made or polystyrene, was stored. The used block copolymer had a molecular weight of 113,000, and the composition ratio of the molecular chains made of polymethylmethacrylic acid, and the molecular chains made of polystyrene was about 1:1. Note that, for storing, the copolymer was made to have a concentration of 1.5 percent by mass using toluene as a solvent, and spin coating was executed.

[Self-Assembly of Block Copolymer]

Figure 3B:
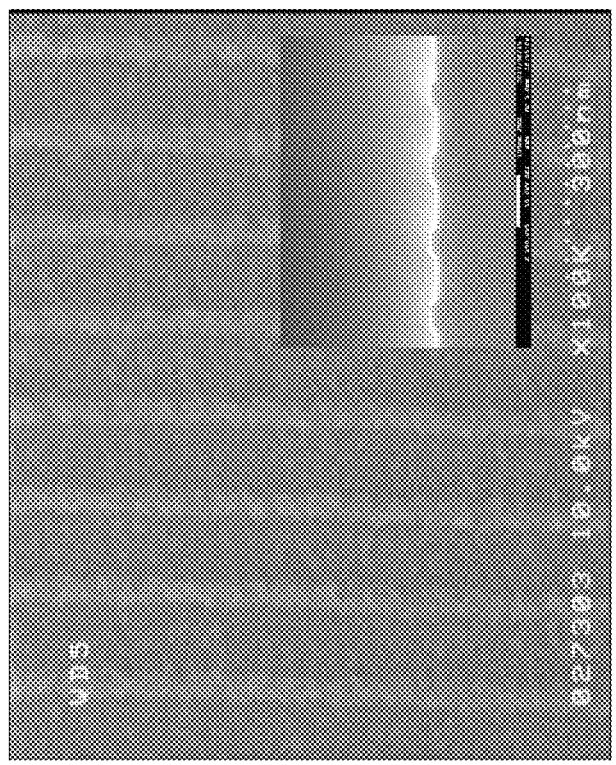

A heat treatment was executed in vacuum at 240° C. for 12 hours to allow the block copolymer containing molecular chains made of polymethylmethacrylic acid, and molecular chains made of polystyrene to self-assembly between the guides 6, thereby achieving phase separation to a structure having an orderly domain. As a result, as shown in FIG. 2A, a cyclic lamella structure where the areas 2 having the molecular chains made of polymethylmethacrylic acid (PMMA), and the areas 3 having the molecular chains made of polystyrene are alternately present along the guides 6, was formed. FIG. 3(b) shows a photograph of the formed cyclic lamella structure. The cycle length of the fabricated cyclic lamella structure is about 45 nm.

[Metal Oxide Precursor Contact Step]

Subsequently, the obtained cyclic lamella structure was contacted with vapor of trimethyl aluminum (TMA) to bind the metal of the metal oxide precursor to the carbonyl group in the area 2 having the molecular chains made of polymethylmethacrylic acid (PMMA), thus forming the metal oxide precursor binding site. The environment into which the vapor was supplied was in a vacuum chamber, and the substrate temperature was 200° C., the pressure was 1 mTorr, the supply time period was 0.3 seconds, and the holding time period was 600 seconds.

[Oxidation Step]

Subsequently, the cyclic lamella structure with the metal oxide precursor binding site being formed was contacted with the moisture vapor to oxidize the metal oxide precursor binding site, thus forming the metal oxide grid made up of the areas 4 containing the metal oxide as the main component, as shown in FIG. 2B. Note that the metal oxide formed in this Example is $Al_2O_3$. The environment into which the moisture vapor was supplied was in a vacuum chamber, and the substrate temperature was 200° C., the pressure was 1 mTorr, the supply time period was 0.3 seconds, and the holding time period was 600 seconds.

[Grid-Shaped Protruding Portions Forming Step]

Subsequently, the areas 3 including the molecular chains made of polystyrene, and the guides 6 were removed, and the grid-shaped protruding portions made $Al_2O_3$ (FIG. 2C) were formed, thus obtaining the inorganic wave plate. To remove the areas 3 including the molecular chains made of polystyrene, and the guides 6, ashing with $O_2$ plasma was performed. The obtained grid-shaped protruding portions of the obtained inorganic wave plate had a pitch of 45 nm, and a height of 13 nm.

EXPLANATION OF REFERENCE NUMERALS

1 Transparent substrate
2 Area containing molecular chains made of polymethylmethacrylic is acid (PMMA)
3 Area containing molecular chains made of polystyrene
4 Area containing metal oxide as main component
5 Resist
6 Guide

The invention claimed is:

1. A method of manufacturing an inorganic wave plate having a wire grid structure, comprising:
   a polymer grid forming step of forming a polymer grid, by using a physical guide to arrange a polymer having a repeating unit containing a carbonyl group, on at least one surface of a transparent substrate, so as to form a grid extending in a predetermined direction, by self-assembly of the polymer;
   a metal oxide precursor contact step of forming a metal oxide precursor binding site, by contacting vapor of the metal oxide precursor with the polymer grid to bind metal of the metal oxide precursor to the carbonyl group; and
   an oxidation step of forming a metal oxide grid containing the metal oxide as a main component, by contacting moisture vapor with the grid having the metal oxide precursor binding site to oxidize the metal oxide precursor binding site to form the inorganic wave plate,
   wherein the inorganic wave plate comprises:
      the transparent substrate; and
      a plurality of grid-shaped protruding portions that are arranged on at least one surface of the transparent substrate at a pitch shorter than a wavelength of light in a used band, and extend in the predetermined direction,
      wherein the plurality of grid-shaped protruding portions contain the metal oxide grid and have two or more types of different pitches present in a mixed manner.

2. The method of manufacturing the inorganic wave plate according to claim 1, wherein the metal oxide precursor contact step, and the oxidation step form a cycle, and the cycle is repeated multiple times.

3. The method of manufacturing the inorganic wave plate according to claim 1, wherein the repeating unit containing the carbonyl group is derived from methylmethacrylate.

4. The method of manufacturing the inorganic wave plate according to claim 1, wherein the polymer having the repeating unit containing the carbonyl group is a block copolymer containing molecular chains made of polymethylmethacrylate, and molecular chains made of polystyrene.

5. The method of manufacturing the inorganic wave plate according to claim 1, further comprising an etching step of performing etching using the metal oxide grid as a mask.

\* \* \* \* \*